Figures 1, 2:
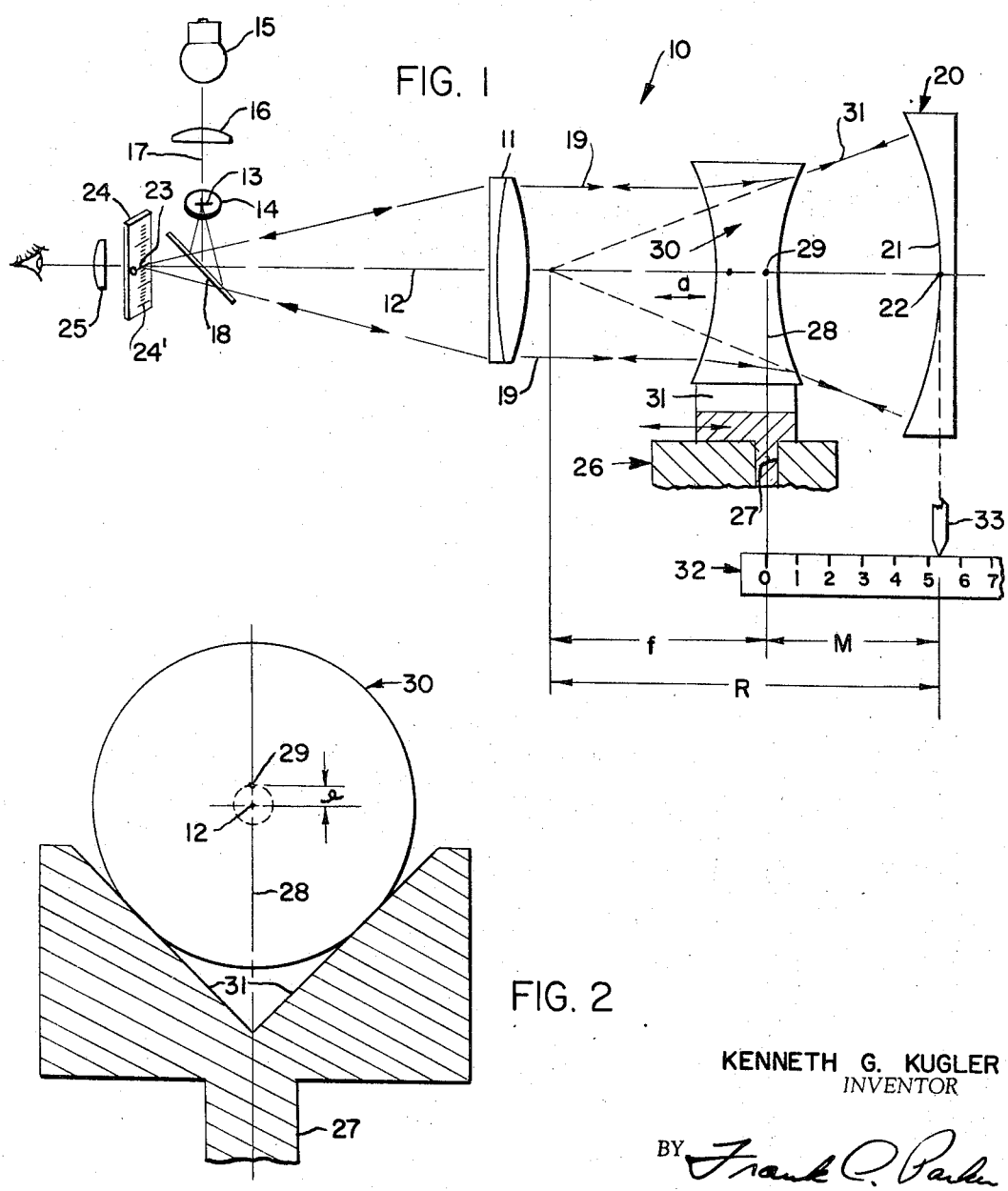

April 2, 1968     K. G. KUGLER     3,375,754

LENS TESTING AUTOCOLLIMATOR

Filed Sept. 29, 1964

KENNETH G. KUGLER
INVENTOR

BY Frank Q. Parker

ATTORNEY

United States Patent Office 3,375,754
Patented Apr. 2, 1968

3,375,754
LENS TESTING AUTOCOLLIMATOR
Kenneth G. Kugler, Rochester, N.Y., assignor to Bausch & Lomb Incorporated, Rochester, N.Y., a corporation of New York
Filed Sept. 29, 1964, Ser. No. 400,178
2 Claims. (Cl. 88—56)

The present invention relates generally to a lens testing autocollimator and more particularly relates to a method and apparatus for determining a focal length measurement and nodal point deviation for negative lenses.

Generally speaking, lens testing apparatus of the aforementioned kind is unduly complicated and this is particularly true where the apparatus is intended to measure both the focal length of a negative lens and the deviation or "run-out" of its nodal point or points. Most of such apparatus requires the use of an auxiliary positive lens having a convergence power large enough to produce co-operatively a real image. It has been found that such methods or apparatuses do not yield truly accurate results, particularly with regard to nodal point "run-out" or eccentricity.

In view of the foregoing, it is an object of the present invention to provide a novel method and apparatus for accurately measuring the focal length of a negative lens and for measuring the deviation of the nodal point of the lens from the geometrical or mechanical axis.

A further object is to provide such a device which is simple in construction and easy to operate, and which is relatively short in overall dimensions and light in weight.

A still further object is to provide such a device which is easily adaptable to a wide variety of lens inspection problems for negative and other lenses, as well as optical plates without severe modification.

Further objects and advantages will be apparent in the arrangement and structure of the parts of this invention as described in the specification herebelow taken together with the accompanying drawing, in which:

FIG. 1 is an optical and schematic diagram showing a preferred form of the present invention, partly in section and broken away; and FIG. 2 is a sectional view of an operating part of said invention.

With particular reference to FIG. 1, the method and apparatus of the present invention comprises essentially an autocollimator which is designated generally by numeral 10. Comprised in said autocollimator is a collimating lens 11 of any preferred construction having an optical axis 12.

Laterally of axis 12 is provided indicia or target means 13 which are formed on a plate 14 of light transmitting material such as glass. Means for illuminating said indicia means 13 are provided preferably by a lamp 15, the light therefrom being projected by a condenser lens 16 upon the plate 14 to transilluminate said means, all of the illuminating and indicia means being optically aligned on a lateral axis 17 intersecting axis 12.

The combination of elements in the present invention further includes a semi-reflecting plano plate 18 which is obliquely positioned at the intersection of axes 17 and 12 so that the optical path length from the collimating lens 11 to the indicia means 13 is equal to the front focal length of said collimating lens.

According to the present invention, a concave mirror 20 having a spherical surface 21 is provided in optical alignment with collimating lens 11 so that the collimated rays 19 are incident on the spherically curved face 21, the apex of which is identified by the numeral 22. Said mirror 20 is spaced at a considerable axial distance from the collimating lens 11 to provide an ample working space for the optical parts to be tested.

The image rays reflected by the mirror 20 as shown by the double headed arrows are converged at the front focal point 23 of the collimating lens 11 so as to form an image of the indicia means 13, and at that point is provided a screen or translucent plate 24 normal to the axis 12. On the plate 24 a deviation scale 24' is formed having its zero mark coincident with axis 12. An eye lens 25 may be provided for viewing said scale 24'.

In the aforesaid working space between the collimating lens 11 and mirror 20 is provided a nodal slide type of lens holder indicated generally by numeral 26. On the nodal slide 26 is a pivot 27 having a vertical axis 28 which coincides with the relevant nodal point 29 of a negative lens 30 to be tested.

A feature of the present invention is the V-shaped seating surface 31 on which the periphery of the negative lens 30 rests. The advantage of the V-shaped seating surface 31 lies in the ability to rotate the lens 30 on its peripheral surface when making the test for decentration or deviation of the nodal point 29 from its true aligned position on axis 12. It is contemplated that other forms of seating mechanism may be used for the negative lens 30 while measuring its local length and nodal centration, the prime requirement being the ability to rotate the lens 30 concentrically with the axis 12 as shown in FIG. 2. The amount of eccentricity or error of the nodal point 29 is indicated in FIG. 2 by the dimension $e$.

As shown in FIG. 1, with a typical negative lens 30 mounted ready for examination, the collimated rays 19 are refracted by said lens as shown at 31 into a direction which is radial to the surface 21 of the mirror 20 and are retroreflected therefrom.

Carried by the nodal slide 26 is a longitudinal linear focus measuring scale 32 extending parallel to axis 12. A zero fiducial mark on the scale 32 is aligned on the axis 28 and a second indicating mark or index 33 is provided adjacent to said scale 32 and aligned with the vertex 22 of the mirror 20.

When operating the described form of the invention, the lamp 15 is energized and a negative lens 30 to be measured is positioned erectly on the seating surfaces 31 of the nodal slide 26 and the periphery of lens 30 is mechanically centered with the collimation axis 12.

In making the measurement to determine a value for the negative focal length of lens 30, the lens 30 is moved longitudinally in the direction of the arrow $a$ within the V seat 31 to a position such that a slight rotation of lens 30 about axis 28 causes no shift of the image of the indicia means which is formed on the screen or plate 24, thus placing nodal point 29 on axis 28.

The negative focal length $f$ of the negative lens 30 is determined by subtracting the indicated scale reading shown on scale 32 from the known radius R of the mirror surface 21.

When measuring the deviation or decentration of the relevant nodal point 29 from the collimation axis 12, the lens 30 is rotated on its periphery without longitudinally shifting its position. As shown in FIG. 2, if an error $e$ exists in the radial location of the relevant nodal point 29, the image of the indicia means 13 formed on the screen 24 will be displaced alternately above and below zero position on the deviation scale 24' during rotation of the lens. Half the total throw of the image measures the eccentricity $e$ of the nodal point. Said scale 24' is calibrated in minutes of arc based on the focal length of the collimating lens 11.

It will be observed that a considerable advantage of the above-described autocollimator is obtained by the double deviation which is obtained by passing the image rays in both directions through the negative lens.

It is within the purview of the present invention to measure positive lenses, not shown, as well as negative lenses by a simple alteration of the apparatus. Principally, the alteration consists of substituting an illuminated target for the mirror 20, said target to be placed at the point 22. In this mechanism the positive lens acts as a collimator having the target as its real object and consequently the scale reading M is the value of its focal length.

It is also possible to test the departure from true parallelism of two opposite surfaces of a plane-parallel plate, not shown, by substituting the plate for the negative lens 30. In the same manner as above described, the double passage of the image rays through the plate results in a double deviation for the image rays refracted by the plate, the deviation of said image being read on the deviation scale 24′.

All of these modifications require only the minimum of apparatus modification and are easy to operate and understand, all of which embody the added advantage of low cost. It will be seen in the foregoing description that there is here provided a precision autocollimator and method for measuring primarily negative focal lengths and nodal point decentration, said method and apparatus being reliable and easy to maintain in best condition and embodying the advantages called for in the foregoing objects of this invention.

Although only a preferred form of the present invention has been shown and described in detail, other forms and modifications are possible and changes may be made in the details thereof without departing from the spirit of the invention as defined in the appended claims.

I claim:

1. An autocollimator for measuring the focal length and axial deviation of a negative lens characterized by the combination of
   a collimating lens,
   indicia means optically aligned with said lens at an axial distance therefrom equal to the front focal length thereof,
   means for illuminating said indicia means,
   a screen optically aligned with the return beam from said lens at an axial distance therefrom equal to the front focal length thereof,
   a spherically concave mirror optically aligned with said lens in the collimated portion of said beam and separated from the lens to provide a working space,
   a nodal slide operatively arranged in said space and having a V-shaped seating surface to position and provide an axis of rotation for a negative lens to be measured coaxially of said collimating lens,
   a longitudinally directed fixed scale whereon
   a first indicator is formed in longitudinal alignment with the nodal rotation axis of the nodal slide, and
   a second indicator is longitudinally aligned with the vertex of said mirror and extends into cooperative position with said scale
   whereby a scale reading equal to the distance between the relevant nodal point of said negative lens and said vertex may be obtained which is subtracted from the known radius of said mirror to yield the negative focal length of said negative lens.

2. An autocollimator for precision measuring of focal length and nodal point decentration of a negative lens, said autocollimator comprising
   a collimating lens,
   a spherically concave mirror facing said lens and spaced therefrom in optical alignment therewith,
   indicia means optically aligned with said lens on the side opposite to the mirror and spaced from the lens at an axial path length equal to the front focal length of the lens,
   a light transmitting plate on which said indicia means is formed, means for transilluminating said indicia means,
   a nodal slide for supporting said negative lens with its relevant nodal point so spaced from the vertex of said mirror that the incident image rays projected from said indicia means are retrodirected by said mirror to the front focal point of the collimating lens,
   a screen erected at said point, and a deviation scale formed thereon having a zero mark coincident with said point, and
   means for measuring the axial distance between said relevant nodal point and said vertex
   whereby the measurement obtained by the last said means is subtracted from the known radius of said mirror to obtain the negative focal length of a negative lens which is positioned on said nodal slide, and whereby the deviation of said relevant nodal point from true optical centration is read on the deviation scale by noting the departure from zero position of the average radial sweep of the image of the indicia means.

References Cited

UNITED STATES PATENTS 2,478,609   8/1949   Townsley _____ 88—56
2,254,548   12/1941  Ruhle et al. _____ 88—56

JEWELL H. PEDERSEN, *Primary Examiner.*

C. E. QUARTON, *Assistant Examiner.*